(12) United States Patent
Holostov et al.

(10) Patent No.: US 9,019,945 B2
(45) Date of Patent: Apr. 28, 2015

(54) SERVICE-ASSISTED NETWORK ACCESS POINT SELECTION

(71) Applicant: Microsoft Corporation, Redmond, WA (US)

(72) Inventors: Vladimir Holostov, Sammamish, WA (US); Thomas W. Kuehnel, Seattle, WA (US); Shai Guday, Redmond, WA (US); Naile Daoud, Bellevue, WA (US); Tript Singh Lamba, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/181,653

(22) Filed: Feb. 15, 2014

(65) Prior Publication Data

US 2014/0162638 A1    Jun. 12, 2014

Related U.S. Application Data

(63) Continuation of application No. 13/291,116, filed on Nov. 8, 2011, now Pat. No. 8,665,847.

(51) Int. Cl.
*H04W 4/00* (2009.01)
*H04W 48/16* (2009.01)
*H04W 4/02* (2009.01)
*H04W 48/20* (2009.01)

(52) U.S. Cl.
CPC ............... *H04W 48/16* (2013.01); *H04W 4/02* (2013.01); *H04W 48/20* (2013.01)

(58) Field of Classification Search
USPC ................. 370/328, 338, 310, 346, 468, 461; 455/434, 41.2, 456.1, 435.2
See application file for complete search history.

(56) References Cited

U.S. PATENT DOCUMENTS

| | | | |
|---|---|---|---|
| 5,717,688 A | 2/1998 | Belanger et al. |
| 6,243,754 B1 | 6/2001 | Guerin et al. |
| 6,801,777 B2 | 10/2004 | Rusch |
| 6,993,584 B2 | 1/2006 | Border et al. |
| 7,330,486 B2 | 2/2008 | Ko et al. |
| 7,466,986 B2 | 12/2008 | Halcrow et al. |
| 7,472,200 B1 | 12/2008 | Taylor et al. |
| 7,821,985 B2 | 10/2010 | Van Megen et al. |

(Continued)

FOREIGN PATENT DOCUMENTS

WO       2006059369 A1    6/2006

OTHER PUBLICATIONS

"Non-final Office Action in U.S. Appl. No. 13/291,116", Mailed Date: Mar. 12, 2013, filed Nov. 8, 2011, 9 Pages.

(Continued)

*Primary Examiner* — David Q Nguyen
(74) *Attorney, Agent, or Firm* — Kate Drakos; Micky Minhas

(57) ABSTRACT

Embodiments enable prioritization and selection of network access points (NAP) by a computing device using NAP attribute values. The computing device obtains the attribute values based on a location of the computing device and/or proximate NAPs detected by the computing device. The obtained attribute values are compared to a state of the computing device (e.g., sensor values), user preferences, or other criteria to select at least one of the NAPs for connection with the computing device. In some embodiments, a user of the computing device is presented with a list of Wi-Fi access points ranked according to relevance to the computing device and/or user.

20 Claims, 7 Drawing Sheets

(56) References Cited

U.S. PATENT DOCUMENTS

| | | | |
|---|---|---|---|
| 7,843,843 B1 | 11/2010 | Papp, III et al. | |
| 7,970,931 B2 | 6/2011 | Ventakaramaiah et al. | |
| 7,974,714 B2 | 7/2011 | Hoffberg | |
| 7,979,577 B2 | 7/2011 | Taylor et al. | |
| 8,078,753 B2 | 12/2011 | Bachmann et al. | |
| 8,271,655 B2 | 9/2012 | Dawson et al. | |
| 8,407,721 B2 | 3/2013 | Dyba et al. | |
| 2003/0065816 A1 | 4/2003 | Dharmadhikari et al. | |
| 2004/0203870 A1 | 10/2004 | Aljadeff et al. | |
| 2006/0211372 A1 | 9/2006 | Shellhammer et al. | |
| 2006/0274713 A1 | 12/2006 | Pandey et al. | |
| 2006/0274750 A1 | 12/2006 | Babbar et al. | |
| 2007/0030855 A1 | 2/2007 | Ribiere et al. | |
| 2007/0061482 A1 | 3/2007 | Higuchi | |
| 2007/0180088 A1 | 8/2007 | Zhao | |
| 2008/0049649 A1 | 2/2008 | Kozisek et al. | |
| 2008/0080413 A1 | 4/2008 | Cole et al. | |
| 2008/0080419 A1 | 4/2008 | Cole | |
| 2008/0080457 A1 | 4/2008 | Cole | |
| 2008/0080458 A1 | 4/2008 | Cole | |
| 2008/0165683 A1 | 7/2008 | Saha et al. | |
| 2008/0192681 A1 | 8/2008 | Lee et al. | |
| 2008/0247344 A1* | 10/2008 | Bahl et al. | 370/310 |
| 2008/0273507 A1 | 11/2008 | Sharma | |
| 2009/0028082 A1 | 1/2009 | Wynn et al. | |
| 2009/0061870 A1 | 3/2009 | Finkelstein et al. | |
| 2009/0147798 A1 | 6/2009 | del Prado Pavon | |
| 2009/0296669 A1 | 12/2009 | Uchiyama et al. | |
| 2010/0110921 A1 | 5/2010 | Famolari et al. | |
| 2010/0184440 A1 | 7/2010 | Mao et al. | |
| 2011/0013569 A1 | 1/2011 | Scherzer et al. | |
| 2012/0113971 A1* | 5/2012 | Giaretta et al. | 370/338 |
| 2012/0225649 A1* | 9/2012 | Yerrabommanahalli et al. | 455/434 |
| 2012/0327849 A1* | 12/2012 | Lin et al. | 370/328 |
| 2013/0023216 A1 | 1/2013 | Moscibroda et al. | |
| 2013/0115945 A1 | 5/2013 | Holostov et al. | |

OTHER PUBLICATIONS

"Final Office Action in U.S. Appl. No. 13/291,116", Mailed Date: Aug. 9, 2013, filed Nov. 8, 2011, 10 Pages.

"Notice of Allowance in U.S. Appl. No. 13/291,116", Mailed Date: Oct. 21, 2013, filed Nov. 8, 2011, 15 Pages.

Iera, et al., "Gateway Discovery and Selection in Mobile Hotspots", In Proceedings of International Conference on Wireless Broadband and Ultra Wideband Communications (Auswireless), Mar. 2006, 8 Pages.

U.S. Appl. No. 14/081,196, "Network Selection Based on Customizing Crowdsourced Connection Quality Data", filed Nov. 15, 2013, 38 pages.

Venkitaraman, et al., "Session Aware Network Controlled Interface Selection for Multi-Homed Hosts", In WCNC 2004/IEEE Communications Society, 2004 IEEE, pp. 1963-1968.

Ylitalo, et al., "Dynamic Network Interface Selection in Multihomed Mobile Hosts", In Proceedings of the 36th Hawaii International Conference on System Sciences (HICSS '03), 2002 IEEE, 10 pages.

Sun, et al., "Towards Connectivity Management Adaptability: Context Awareness in Policy Representation and End-to-end Evaluation Algorithm", MUM 2004, Oct. 27-29, 2004, College Park, Maryland, USA, 2004 ACM, 8 pages.

* cited by examiner

SERVICE-ASSISTED NETWORK ACCESS POINT SELECTION

CROSS-REFERENCE TO RELATED APPLICATION

This application is a continuation of U.S. application Ser. No. 13/291,116, filed Nov. 8, 2011, the entirety of which is hereby incorporated by reference herein.

BACKGROUND

Mobile devices such as mobile telephones, laptops, and tablets can connect to other devices and networks via public or private Wi-Fi "hotspots." With existing systems, users of the mobile devices often have a difficult time selecting a hotspot that provides reliable Internet connectivity. For example, some hotspots are poorly configured, malfunctioning, or even malicious, while other hotspots may require payment or a complex registration procedure before allowing access. Further, in densely populated areas in which there may be dozens of available hotspots, users often have to select one of the hotspots for connection via trial-and-error.

In existing systems, the mobile devices consume substantial amounts of battery power scanning for available hotspots. Further, the scanning may occur even when no hotspots are within range of the mobile devices, or when the mobile device cannot establish a reliable connection. As such, the existing systems reduce battery life with little benefit to the users.

SUMMARY

Embodiments of the disclosure aid network access point (NAP) discovery and selection. A computing device determines a location of the computing device and/or detects nearby NAPs. The computing device obtains attribute values corresponding to one or more NAPs near the determined location of the computing device and/or based on the detected nearby NAPs. The obtained attribute values are compared to one or more sensor values representing a state and/or characteristics of the computing device (e.g., supported frequencies, availability of authentication mechanisms, and affiliation with NAP operators). The comparison is used to prioritize the available NAPs for the user. In some embodiments, the computing device automatically connects to the NAP with the highest rating.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
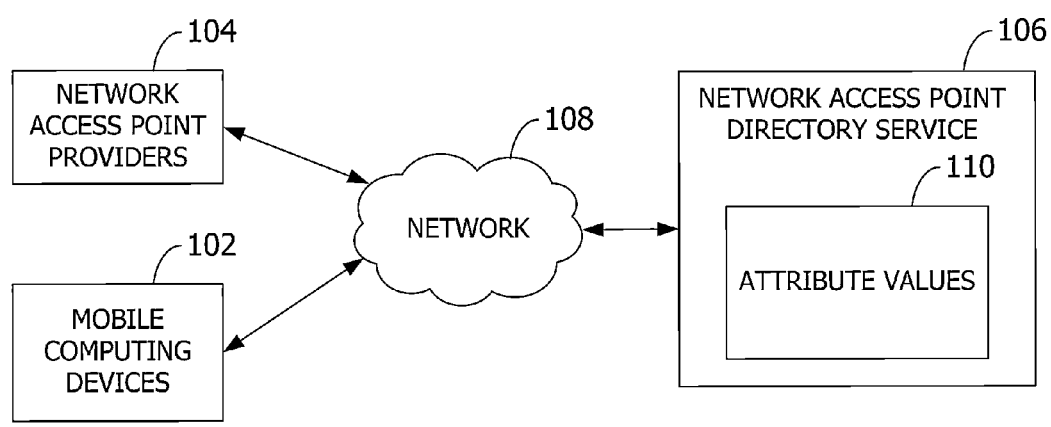
FIG. 1 is an exemplary block diagram illustrating mobile computing devices and network access point providers communicating with a network access point directory service.

Referring to the figures, embodiments of the disclosure enable the discovery and selection of network access points 218 (NAPs) while preserving battery life. In some embodiments, a NAP directory service 106 aggregates attribute values 110 describing NAPs 218 and shares the aggregated attribute values 110 with computing devices 202 such as mobile computing devices 102. The computing devices 202 filter the NAPs 218 based on device state or other criteria or parameters to identify NAPs 218 relevant to the computing devices 202. For example, the identified NAPs 218 are prioritized for presentation to, and selection by, the user. In other embodiments, the computing device 202 automatically connects to a preferred one of the identified NAPs 218 (e.g., the NAP 218 with the highest rating). Aspects of the disclosure also enable the computing devices 202 to adjust scan patterns 214 (e.g., optimize Wi-Fi scanning by, for example, temporarily disabling scanning) according to the availability of proximate NAPs 218, or lack thereof, to preserve battery life.

Referring next to FIG. 1, an exemplary block diagram illustrates mobile computing devices 102 and NAP providers 104 communicating with the NAP directory service 106. The mobile computing devices 102 may be a single device or a plurality of devices such as mobile telephones. While described as mobile computing devices 102 in examples herein, aspects of the disclosure are operable with any computing device 202. The NAP providers 104 may be a single provider or a plurality of providers including any entity that provides, maintains, and/or operates one or more NAPs 218. For example, the NAP providers 104 may represent mobile operators, Wi-Fi aggregators, access point operators, or any other entity. The NAPs 218 include any means for connecting one device to another device. The NAPs 218 provide wired and/or wireless connection to the mobile computing devices 102. Exemplary NAPs 218 include Internet hotspots, Ethernet portals, fiber portals, local area network portals, wide area network portals, cellular portals, broadband portals, and the like.

In the example of FIG. 1, the mobile computing devices 102 and the NAP providers 104 communicate with the NAP directory service 106 via a network 108 such as the Internet. The network 108, however, may include any network and is not limited to the Internet.

The NAP directory service 106 represents any service that collects, on an on-going basis, data describing NAPs 218 and/or the mobile computing devices 102. In some embodiments, the NAP directory service 106 is a cloud-based service that collects data in the form of reports. The NAP directory service 106 may, in some embodiments, share at least a portion of the collected data (and possibly data derived therefrom) with other devices. For example, the NAP directory service 106 aggregates data from the mobile computing devices 102 and makes available the aggregated data, or a portion thereof. The NAP directory service 106 may also infer or derive data based on the collected data. For example, overall statistics and trends may be inferred. The aggregated data and/or the derived data may be shared with the mobile computing devices 102, the NAP providers 104, or both. In some embodiments, the aggregation and sharing of the data is referred to as crowdsourcing.

In some embodiments, the NAP directory service 106 determines whether to accept reports from particular entities based on entity reputation and the quantity of reports involving the same NAPs 218. For example, a report is given high fidelity if the submitting mobile computing device 102 has submitted reliable reports in the past. The NAP directory service 106 may also weight or discount reports based on the entity reputation.

The NAP directory service 106 collects data that is obtained, calculated, or otherwise provided by the mobile computing devices 102 and/or the NAP providers 104. In some embodiments, the collected data describes attributes associated with NAPs 218 detected by the mobile computing devices 102 as well as attributes associated with the mobile computing devices 102 themselves. For example, the mobile computing devices 102 collect attribute values 110 corresponding to one or more of the following attributes of the NAPs 218: NAP name (e.g., SSID), whether registration by the mobile computing device 102 is required, roaming partners, reliability, availability, security settings (e.g., authentication and encryption protocols), location (e.g., fixed or mobile), presence of captive portal and authentication protocols (e.g., wireless Internet service provider roaming), use costs and conditions (e.g., free for subscribers of a particular mobile operator), basic service set identification (BSSID) such as operating frequencies and wireless standards, observed quality of service (QoS), supported throughput and latency, access limitations (e.g., blocked ports, destinations), location per BSSID, association successes and failures, timestamp associated with the attribute values 110, association with identity management entity for federated access, equipment maker and model of the mobile computing device 102, elapsed time between connection to the NAP 218 and the transfer of data, connection duration, signal strength, and packet loss.

In some embodiments, the NAP directory service 106 calculates or otherwise determines attribute values 110 for one or more of the above-listed attributes of the NAPs 218 based on other received attribute values 110. Further, the NAP providers 104 may provide attribute values 110 for one or more of the above-listed attributes. For example, the NAP providers 104 may identify NAPs 218 and capabilities of each of these NAPs 218.

As another example, the mobile computing devices 102 collect attribute values 110 corresponding to one or more of the following attributes of the mobile computing devices 102: identifier, location, speed, direction of movement, device capabilities (e.g., supported frequencies, standards, and authentication protocols), roaming agreements (e.g., between mobile operator and NAP provider 104), application requirements (e.g., voice, video, gaming, basic browsing), age of the last report related to the NAP 218 from the mobile computing device 102 (e.g., outdated entries may be removed by the NAP directory service 106), and federated identity that can be used to limit exposure of the NAP 218 (e.g., corporate or university network infrastructure).

In some embodiments, the NAP directory service 106 calculates or otherwise determines attribute values 110 for one or more of the above-listed attributes of the mobile computing devices 102 based on other received attribute values 110.

Figure 2:
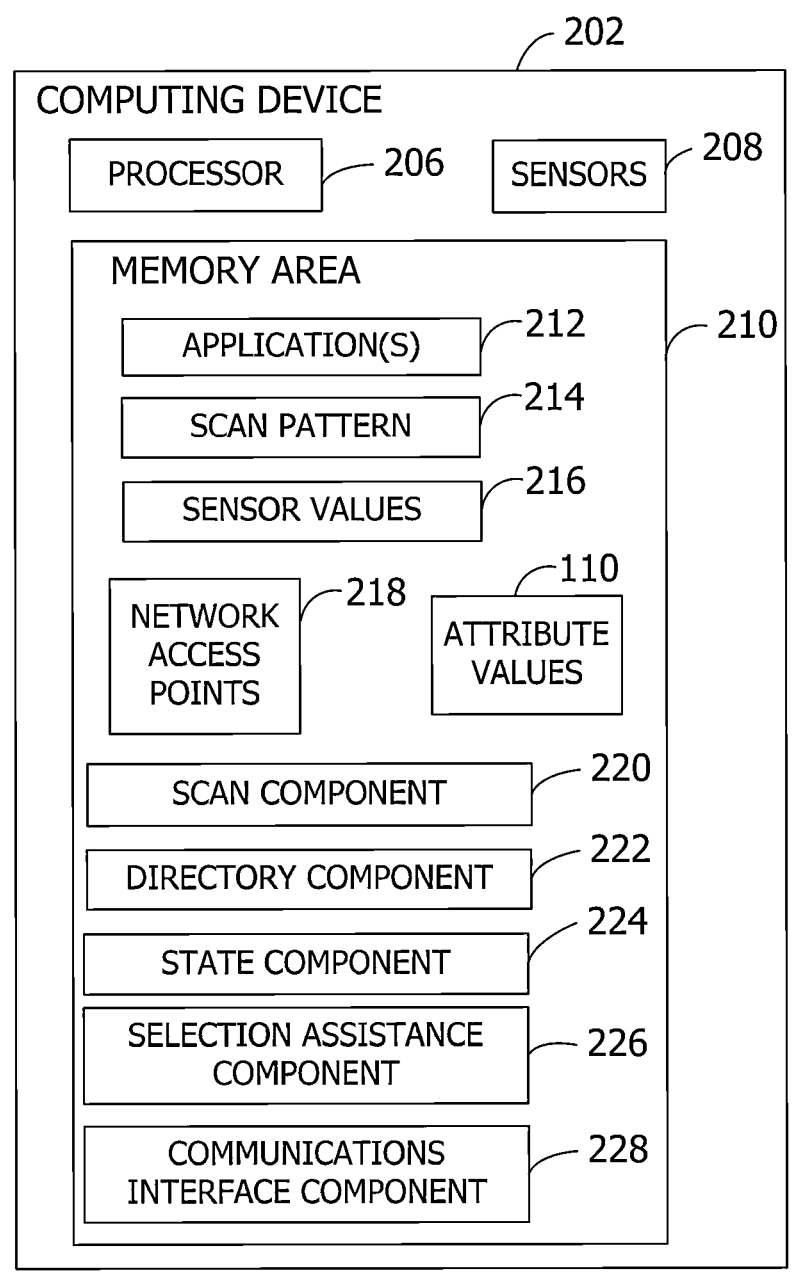
FIG. 2 is an exemplary block diagram illustrating a computing device storing data and logic for aiding network access point discovery and selection.

Referring next to FIG. 2, an exemplary block diagram illustrates the computing device 202 storing data and logic for aiding NAP 218 discovery and selection. The computing device 202 represents any device executing instructions (e.g., as application programs, operating system functionality, or both) to implement the operations and functionality associated with the computing device 202. The computing device 202 may be the mobile computing device 102 or any other portable device. In some embodiments, the mobile computing device 102 includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

The computing device 202 has at least one processor 206, one or more sensors 208, and a memory area 210. The processor 206 includes any quantity of processing units, and is programmed to execute computer-executable instructions for implementing aspects of the disclosure. The instructions may be performed by the processor 206 or by multiple processors executing within the computing device 202, or performed by a processor external to the computing device 202. In some embodiments, the processor 206 is programmed to execute instructions such as those illustrated in the figures (e.g., FIG. 4, FIG. 5, and FIG. 6).

The computing device 202 further has one or more sensors 208 associated therewith. The sensors 208 may be internal and/or external to the computing device 202. Exemplary sensors 208 include, but are not limited to, a cellular radio or modem, a global positioning system (GPS) receiver, a Wi-Fi adapter or modem, a BLUETOOTH brand communication service element, a three-dimensional motion sensor, a camera, a microphone, one or more accelerometers, and a photoreceptive light sensor. Each of the sensors 208 provides at least one sensor value 216 for use by the computing device 202 (e.g., by an operating system or applications 212). The type and range of the sensor values 216 vary based on the sensor 208 and may include, for example, numerical values and/or alphabetic values.

The computing device 202 further has one or more computer readable media such as the memory area 210. The memory area 210 includes any quantity of media associated with or accessible by the computing device 202. The memory area 210 may be internal to the computing device 202 (as shown in FIG. 2), external to the computing device 202 (not shown), or both (not shown).

The memory area 210 stores, among other data, one or more applications 212. The applications 212, when executed by the processor 206, operate to perform functionality on the computing device 202. Exemplary applications 212 include mail application programs, web browsers, calendar application programs, address book application programs, messaging programs, media applications, location-based services, search programs, and the like. The applications 212 may communicate with counterpart applications or services such as web services accessible via a network. For example, the applications 212 may represent downloaded client-side applications that correspond to server-side services executing in a cloud.

The memory area 210 further stores at least one scan pattern 214. The scan pattern 214 represents a schedule or other criteria used by the computing device 202 to determine when and how to scan, detect, or otherwise observe NAPs 218 or other devices proximate to the computing device 202. For example, based on the scan pattern 214, the computing device 202 may scan for NAPs 218 every minute, every 10 minutes, or manually upon request from the user.

The attribute values 110 for the NAPs 218 and the observing computing devices 202 may be stored in the memory area 210. In some embodiments, the attribute values 110 stored in the memory area 210 represent a cache of the attribute values 110 observed by the computing device 202. In other embodiments, the attribute values 110 stored in the memory area 210 represent cached attribute values 110 pushed by the NAP directory service 106 or otherwise provided by the NAP directory service 106. For example, the cached attribute values 110 represent a subset of attribute values 110 from the NAP directory service 106 filtered by a location of the computing device 202.

The memory area 210 may further store a set of observed or nearby NAPs 218. Each NAP 218 may be identified by any identifier unique among the NAPs 218.

The memory area 210 further stores one or more computer-executable components. Exemplary components include a scan component 220, a directory component 222, a state component 224, a selection assistance component 226, and a communications interface component 228. Operation of the components is described below with reference to FIG. 5.

Figure 3:
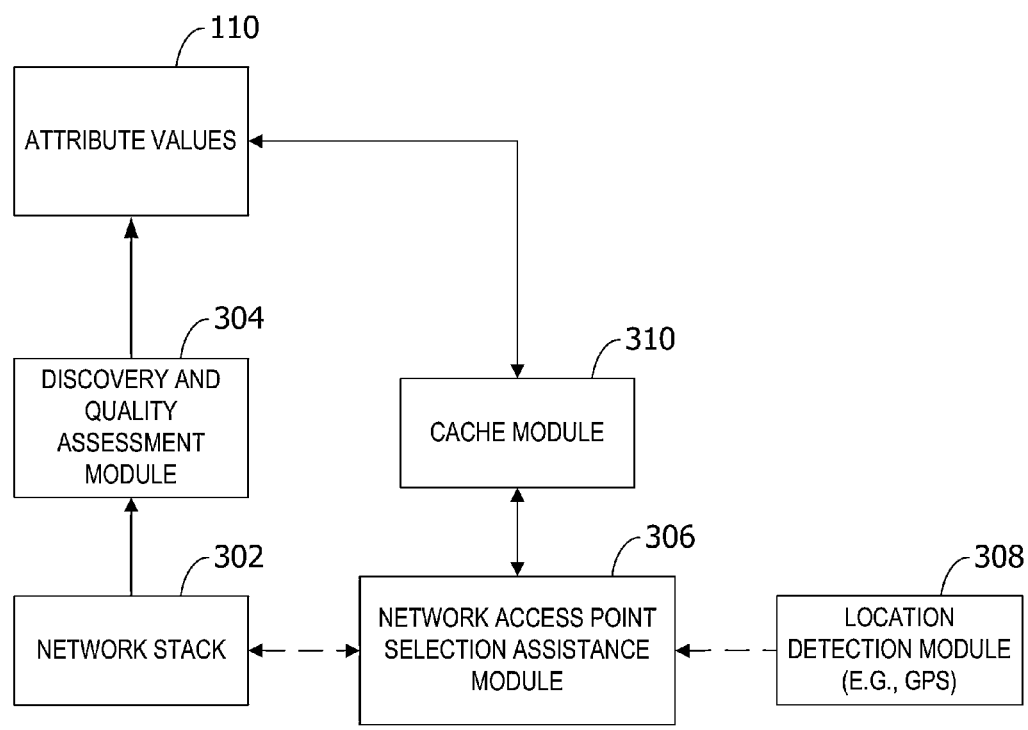
FIG. 3 is an exemplary block diagram illustrating modules for storing attribute values and using the attribute values to select a network access point for connection.

Referring next to FIG. 3, an exemplary block diagram illustrates modules for storing attribute values 110 and using the attribute values 110 to select at least one of the NAPs 218 for connection. In some embodiments, the modules are associated with the computing device 202. A discovery and quality assessment module 304 works with a network stack 302 to identify one or more nearby NAPs 218 detected by the computing device 202. The discovery and quality assessment module 304 further determines attribute values 110 associated with each of the detected NAPs 218 and generates a report for delivery to the NAP directory service 106. The discovery and quality assessment module 304 may determine the attribute values 110 upon and during connection to the NAP 218. The attribute values 110 are stored in, for example, a database or other memory area 210 associated with the computing device 202. The attribute values 110 may also be shared by the computing device 202 with other entities, such as with the NAP directory service 106.

In the example of FIG. 3, a NAP selection assistance module 306 receives data from a location detection module 308 and/or the network stack 302. For example, the location detection module 308 includes a GPS receiver or any other hardware and/or software for determining a location or position of the computing device 202. The location may include GPS coordinates, an address, a store name, nearby landmarks, and the like. The network stack 302 identifies one or more nearby NAPs 218 detected by the computing device 202.

The NAP selection assistance module 306 uses the output from the location detection module 308 and/or the network stack 302 to filter the attribute values 110 and store the filtered attribute values 110 in a cache module 310 (e.g., to reduce server queries). The filtered attribute values 110 in the cache module 310 represent the attribute values 110 of interest to the computing device 202. For example, the attribute values 110 correspond to NAPs 218 near the computing device 202.

The operations next described with reference to FIG. 4, FIG. 5, and FIG. 6 may be implemented by an operating system executing on the computing device 202. In other embodiments, the operations are implemented by at least one of the applications 212 executing on the computing device 202. In still other embodiments, some of the operations are performed by the computing device 202, while the remaining operations are performed by another entity (e.g., the NAP directory service 106).

Figure 4:
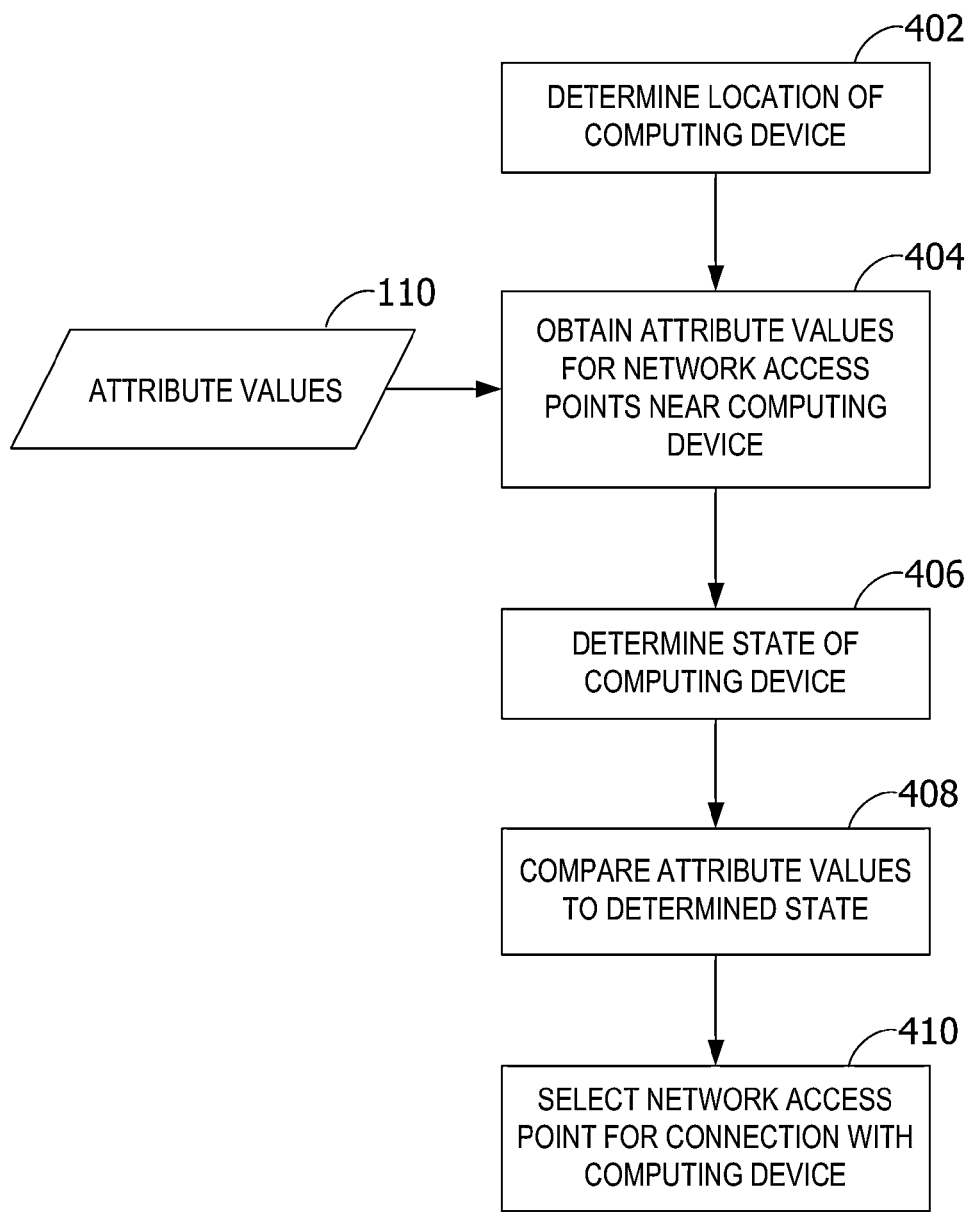
FIG. 4 is an exemplary flow chart illustrating operation of a computing device to select a network access point based on a location of the computing device.

Referring next to FIG. 4, an exemplary flow chart illustrates operation of the computing device 202 to select at least one of the NAPs 218 based on a location of the computing device 202. In the example of FIG. 4, the computing device 202 performs the illustrated operations without scanning for proximate NAPs 218. In this embodiment, the computing device 202 reduces battery consumption compared to embodiments in which the computing device 202 performs repeated scans. At 402, the computing device 202 determines its location. For example, the computing device 202 uses one of the sensors 208 (e.g., a GPS receiver) to determine the location of the computing device 202. While described with reference to GPS, aspects of the disclosure are operable with any location determination means.

At 404, the computing device 202 obtains attribute values 110 corresponding to one or more NAPs 218 near the determined location of the computing device 202. For example, the computing device 202 searches the memory area 210 to identify NAPs 218 whose locations are near the determined location of the computing device 202. The computing device 202 then obtains the attribute values 110 corresponding to the identified NAPs 218. In another example, the computing device 202 sends the determined location of the computing device 202 to the NAP directory service 106. The NAP directory service 106 identifies the NAPs 218 whose locations are near the determined location of the computing device 202. The NAP directory service 106 then obtains the attribute values 110 corresponding to the identified NAPs 218 and sends those attribute values 110 to the computing device 202. In other examples, the computing device 202 obtains the attribute values 110 from a peer computing device (e.g., for those computing devices 202 without access to the NAP directory service 106), at least one of the NAP providers 104, and/or proximate NAPs 218.

The identified NAPs 218 may be within detection range of the computing device 202 (e.g., the computing device 202 could detect the identified NAPs 218 if the computing device 202 performed a scan) or outside the detection range (e.g., the computing device 202 may be near, but outside of, the range of at least one of the identified NAPs 218).

At 406, the computing device 202 determines its state. For example, the computing device 202 obtains sensors values from one or more of the sensors 208 associated with the computing device 202. Exemplary sensors 208 include one or more of the following: a compass, a gyroscope, a GPS receiver, an accelerometer, a proximity sensor, and a battery state sensor. In another example, the determined state may also indicate preferences of the computing device 202 and/or the user for use in selecting NAPs 218.

At 408, the computing device 202 compares the obtained attribute values 110 with the determined state. For example, the computing device 202 compares the attribute values 110 to one or more of the sensor values 216 representing the determined state or to other data associated with the computing device 202 and/or the user. At 410, the computing device 202 selects, based on the comparison, at least one of the NAPs 218 near the computing device 202. For example, the computing device 202 may rank, rate, prioritize, or otherwise order the NAPs 218 based on the comparison, and then select the top-ranked NAP 218. The computing device 202 selects the NAP 218 that is most suitable or most appropriate given the determined state of the computing device 202. For example, if the state of the computing device 202 indicates that the computing device 202 is moving, the computing device 202 selects the NAP 218 that is also moving (e.g., Wi-Fi on a bus or on an airplane). In embodiments in which the computing device 202 is the mobile computing device 102, the mobile computing device 102 selects the NAP 218 based on a roaming agreement between a mobile operator associated with the mobile computing device 102 and NAP providers 104.

Alternatively or in addition, the computing device 202 considers user preferences when selecting the NAP 218. Exemplary user preferences may specify minimum connection security or desired communication types.

The computing device 202 attempts to connect with the selected NAP 218, or may postpone connection establishment. For example, if the computing device 202 is moving towards the selected NAP 218, the computing device 202 may wait to connect until the computing device 202 gets closer to the selected NAP 218.

Further, the computing device 202 may establish a connection with the selected NAP 218 automatically (e.g., in response to NAP 218 selection, without user input at the time of connection, or the like), or may prompt the user to confirm the selection of the NAP 218. For example, the computing device 202 may present a set of candidate NAPs 218 to the user for selection. After selection of at least one of the NAPs 218 by the user, the computing device 202 attempts to establish a connection with the selected NAP 218. In some embodiments, the computing device 202 ranks or orders the candidate NAPs 218 and presents the ranked set to the user for selection.

Figure 5:
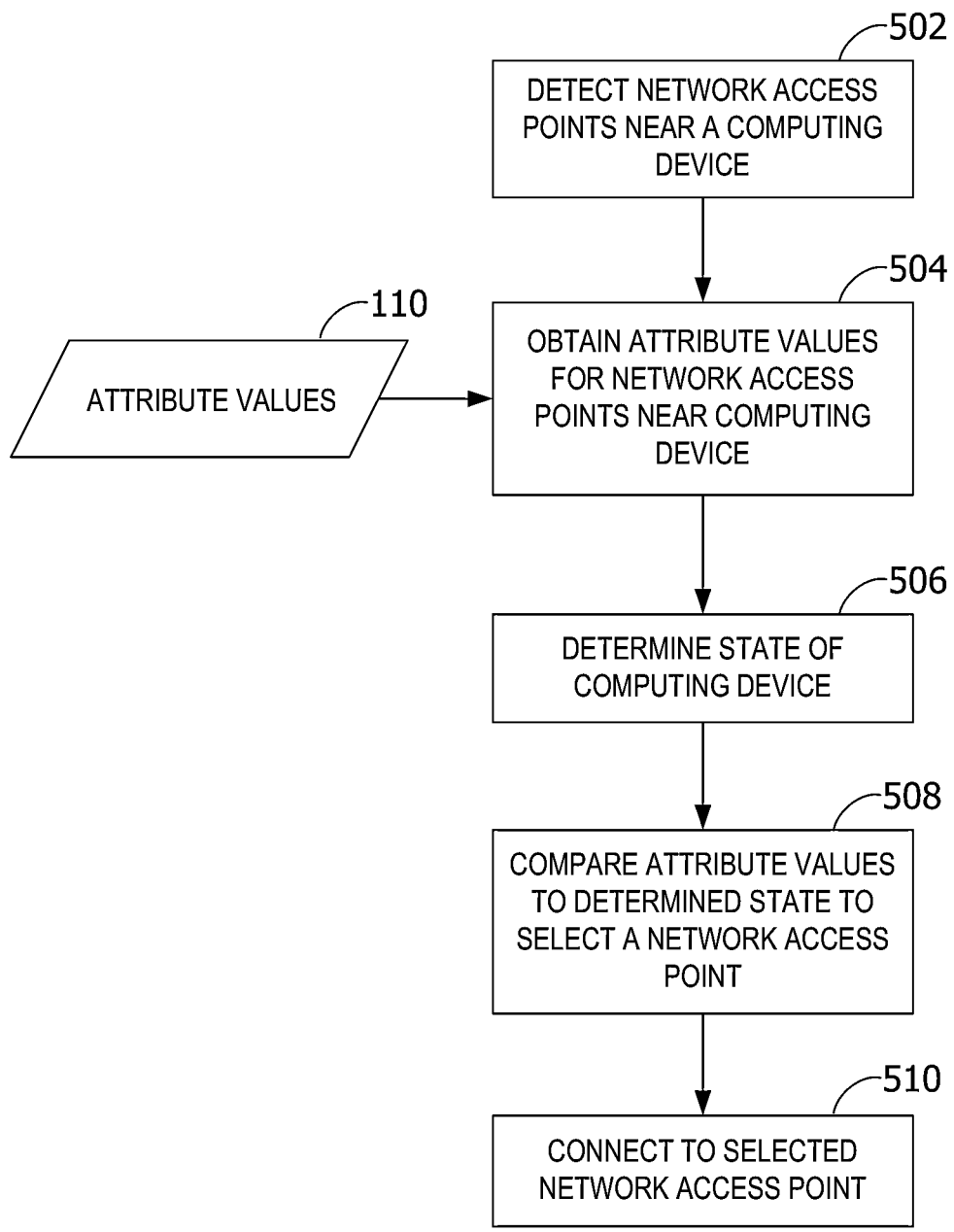
FIG. 5 is an exemplary flow chart illustrating operation of a computing device to select a network access point based on detected, nearby network access points.

Referring next to FIG. 5, an exemplary flow chart illustrates operation of the computing device 202 to select at least one of the NAPs 218 based on detected, nearby NAPs 218. In the example of FIG. 5, the computing device 202 performs the illustrated operations without determining a location of the computing device 202. In this embodiment, the computing device 202 reduces battery consumption compared to embodiments in which the computing device 202 performs location determination. The operations illustrated in FIG. 5 are next described with reference to the computer-executable components illustrated in FIG. 2.

At 502, the scan component 220, when executed by the processor 206, causes the processor 206 to detect one or more NAPs 218 within a detection range of the computing device 202. At 504, the directory component 222, when executed by the processor 206, causes the processor 206 to obtain attribute values 110 corresponding to the NAPs 218 detected by the scan component 220. For example, the directory component 222 obtains the attribute values 110 by communicating with the NAP directory service 106. At 506, the state component 224, when executed by the processor 206, causes the processor 206 to determine the state of the computing device 202. For example, the state component 224 obtains one or more sensor values 216.

At 508, the state component 224 further compares the attribute values 110 obtained by the directory component 222 to one or more of the sensor values 216 representing the state of the computing device 202. The selection assistance component 226, when executed by the processor 206, causes the processor 206 to select, based on the comparison performed by the state component 224, at least one of the NAPs 218 for connection with the computing device 202. At 510, the communications interface component 228, when executed by the processor 206, causes the processor 206 to establish a connection between the computing device 202 and the NAP 218 selected by the selection assistance component 226. In some embodiments, the communications interface component 228 includes a network interface card and/or computer-executable instructions (e.g., a driver) for operating the network interface card.

In some embodiments, the scan component 220 further determines a location of the computing device 202 for use by the directory component 222 when obtaining the attribute values 110.

Figure 6:
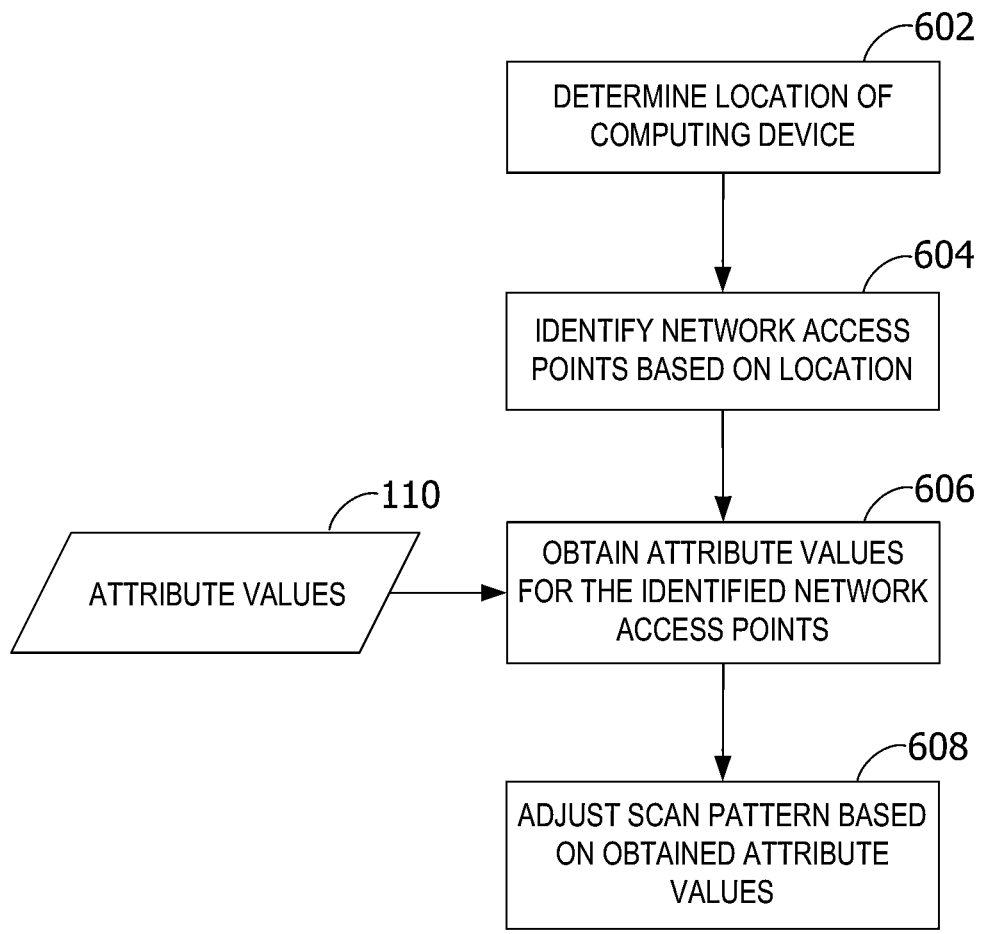
FIG. 6 is an exemplary flow chart illustrating operation of a computing device to adjust a scan pattern based on attribute values associated with network access points.

Referring next to FIG. 6, an exemplary flow chart illustrates operation of the computing device 202 to adjust at least one of the scan patterns 214 based on attribute values 110 associated with NAPs 218. The scan patterns 214 are stored in the memory area 210. The operations illustrated in FIG. 6 execute to adjust the scan patterns 214 to decrease power consumption by the computing device 202.

At 602, the computing device 202 determines its location. At 604, based on the determined location, the computing device 202 identifies one or more of the NAPs 218. At 606, the computing device 202 obtains the attribute values 110 corresponding to the identified NAPs 218. At 608, the computing device 202 adjusts the scan pattern 214 based at least on the obtained attribute values 110. In some embodiments, the computing device 202 compares the obtained attribute values 110 to at least one of the sensor values 216, and adjusts the scan pattern 214 based on the comparison between the obtained attribute values 110 and the sensor value 216. The computing device 202 may adjust the scan pattern 214 to disable, suppress, prevent, or otherwise alter scanning by the computing device 202 of one or more of the NAPs 218. For example, if the identified NAPs 218 are far from the computing device 202 or if the NAPs 218 are unreliable, the computing device 202 conserves battery power by not scanning for the NAPs 218 until the current location of the computing device 202 changes or until the computing device 202 determines that at least one of the identified NAPs 218 is reliable. In another example, if the state of the computing device 202 indicates that the computing device 202 is moving at high speeds (e.g., in an automobile or on a plane), the computing device 202 prevents scanning for non-mobile NAPs 218.

In some embodiments, the computing device 202 may adjust the scan pattern 214 to pre-fetch attribute values 110. For example, upon arriving at an airport of a particular city or upon approach to a particular geographic area, the computing device 202 may pre-fetch a set of NAPs 218 proximate to the airport or within the geographic area to enable the user to quickly connect to the Internet.

Adjusting the scan pattern 214 to conserve battery power may prophetically result in a half-hour to a few hours of additional standby time using current mobile devices.

Figure 7:
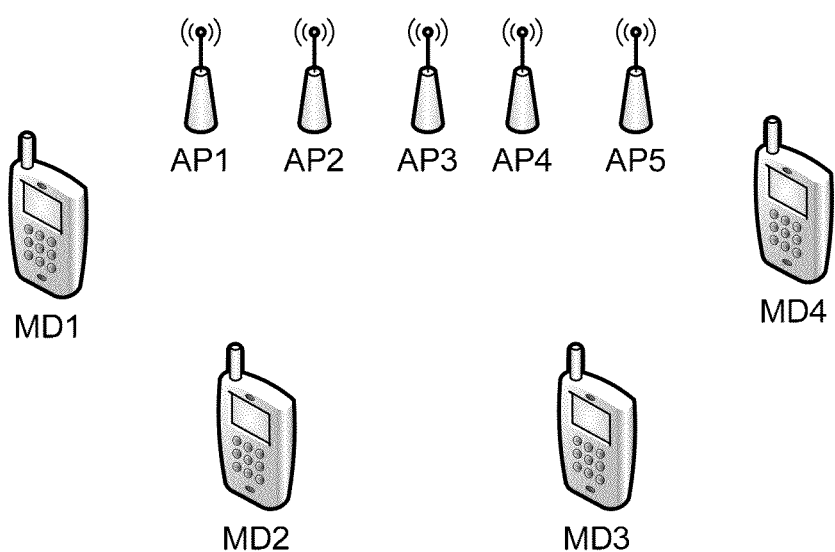
FIG. 7 is an exemplary block diagram illustrating a plurality of mobile computing devices detecting a plurality of network access points.

Referring next to FIG. 7, an exemplary block diagram illustrates a plurality of mobile computing devices detecting a set of NAPs. In the example of FIG. 7, mobile device MD2 detects five proximate NAPs (e.g., AP1, AP2, AP3, AP4, and AP5). MD2 queries the NAP directory service 106, or any data store containing the attribute values 110, by providing the identifiers of the detected NAPs and the location of the MD2. The NAP directory service 106 responds to MD2 with the attribute values 110 pertaining to the detected NAPs.

In this example, the attribute values 110 indicate that AP1 and AP2 have been reported to be inaccessible, and that the reports are credible (e.g., high fidelity). The attribute values 110 further indicate that AP3 requires payment, that AP4 is usually overloaded and does not support voice-over-Internet-Protocol (VoIP) calls, and that AP5 is associated with the mobile operator of MD2 and is known to be in good health. Based on these attribute values 110, MD2 decides to connect to AP5. After being connected to MD2 for some time (e.g., minutes, hours, etc), MD2 generates a report including QoS and connection duration. Because MD2 is a device known to the NAP directory service 106 to have submitted previously a large number of reports, the NAP directory service 106 considers the report to be reliable and updates the attribute values 110 stored by the NAP directory service 106.

Additional Examples

In some embodiments, the NAP directory service 106 shares at least a portion of the attribute values 110 aggregated from the mobile computing devices 102 with the NAP providers 104. Sharing includes, but is not limited to, sharing in response to queries from the NAP providers 104 (e.g., a request for a NAP profile). For example, the NAP directory service 106 may identify link quality, QoS, user behavior, and other attributes of the NAPs 218 managed by the NAP providers 104. Sharing such information may help the NAP providers 104 establish or supplement a network operation center, load balance, and perform network planning based on utilization and trends (e.g., fill in any gaps in NAP coverage). In some embodiments, the shared attribute values 110 are first anonymized by the NAP directory service 106 to prevent discovery by the NAP providers 104 of the mobile computing devices 102 and users who submitted the reports.

In an example scenario, the computing device 202 learns connection preferences of the user by observing user behavior when selecting and connecting to NAPs 218. For example, the computing device 202 may define QoS preferences by observing which applications 212 the user executes when connected to one of the NAPs 218 and the amount of data transmitted by those applications 212. The computing device 202 may also observe other criteria during connection such as time-of-day, location, and connection duration. The computing device 202 applies the learned preferences (and any explicit user preferences) to select NAPs 218.

In another example scenario, the NAP directory service 106 distributes a list of prioritized NAPs 218 to the mobile computing devices 102 for use when the mobile computing devices 102 are outside the network boundaries of their mobile operator. The mobile computing devices 102 leverage this list when selecting one of the NAPs 218 to reduce the cost of data access for the user.

In some embodiments, after selection of one of the NAPs 218, the computing device 202 provides navigation directions to lead the computing device 202 closer to the selected NAP 218 to either enable connection or enable a better connection (e.g., stronger signal strength).

At least a portion of the functionality of the various elements in FIG. 1, FIG. 2, and FIG. 3 may be performed by other elements in FIG. 1, FIG. 2, or FIG. 3, or an entity (e.g., processor, web service, server, application program, computing device, etc.) not shown in FIG. 1, FIG. 2, or FIG. 3.

In some embodiments, the operations illustrated in FIG. 4, FIG. 5, and FIG. 6 may be implemented as software instructions encoded on a computer readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media exclude propagated data signals. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for adjusting the scan pattern 214 based on the attribute values 110 of the NAPs 218 and a state of the mobile computing device 102, and exemplary means for selecting at least one of the NAPs 218 based on the attribute values 110 of the NAPs 218 and a state of the mobile computing device 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for aiding network access point (NAP) selection, said system comprising:
    a memory area associated with a mobile computing device, said memory area storing data representing a set of NAPs and corresponding attribute values; and
    a processor programmed to:
        determine a location of the mobile computing device;
        send the determined location of the mobile computing device to a NAP directory service;
        receive, from the NAP directory service, indentified NAPs whose locations are near the determined location of the mobile computing device;
        obtain attribute values corresponding to the NAPs near the determined location of the mobile computing device;
        compare the obtained attribute values to one or more sensor values representing a state of the mobile computing device; and
        select, based at least on the comparison and without scanning for the NAPs near the determined location, at least one of the NAPs for connection with the mobile computing device.

2. The system of claim 1, wherein the processor is further programmed to search the memory area to identify the NAPs whose locations are near the determined location of the mobile computing device.

3. The system of claim 1, wherein the mobile computing device is outside a range of at least one of the identified NAPs.

4. The system of claim 1, wherein the attribute values are obtained from a peer computing device.

5. The system of claim 1, wherein the processor is further programmed to postpone connection establishment with the selected at least one of the NAPs based at least on the state of the mobile computing device.

6. The system of claim 1, wherein the memory area further stores a scan pattern representing a schedule for observing proximate NAPs and the processor is further programmed to adjust the scan pattern to pre-fetch the attribute values.

7. The system of claim 1, wherein the processor is further programmed to:
    learn connection preferences of a user of the mobile computing device; and
    apply the learned connection preferences of the user to select the at least one of the NAPs.

8. The system of claim 1, wherein the processor is further programmed to provide navigation directions, after selection of the at least one of the NAPs, to lead the mobile computing device closer to the selected at least one of the NAPs.

9. A method comprising:
    determining a location of a computing device;
    sending, by a processor associated with the computing device, the determined location of the computing device to a network access point (NAP) directory service;
    receiving, from the NAP directory service, a set of NAPs whose locations are near the determined location of the computing device;
    obtaining attribute values for the NAPs in the received set of NAPs;
    comparing the obtained attribute values to one or more sensor values representing a state of the computing device; and
    selecting, based at least on the comparison and without scanning for the NAPs near the determined location, at least one of the NAPs for connection with the computing device.

10. The method of claim 9, wherein the computing device is outside a range of at least one of the set of NAPs.

11. The method of claim 9, further comprising postponing connection establishment with the selected at least one of the NAPs based at least on the state of the computing device.

12. The method of claim 9, further comprising adjusting a scan pattern, representing a schedule for observing proximate NAPs, to pre-fetch the attribute values.

13. One or more computer storage media embodying computer-executable instructions which, when executed by a processor associated with a computing device, perform operations comprising:
    determining a location of a computing device;
    sending, by a processor associated with the computing device, the determined location of the computing device to a network access point (NAP) directory service;
    receiving, from the NAP directory service, a set of NAPs whose locations are near the determined location of the computing device;
    obtaining attribute values for the NAPs in the received set of NAPs;
    comparing the obtained attribute values to one or more sensor values representing a state of the computing device; and
    selecting, based at least on the comparison and without scanning for the NAPs near the determined location, at least one of the NAPs for connection with the computing device.

14. The computer storage media of claim 13, wherein the attribute values are obtained from a peer computing device.

15. The computer storage media of claim 13, wherein the computer-executable instructions further perform operations comprising postponing connection establishment with the selected at least one of the NAPs based at least on the state of the computing device.

16. The computer storage media of claim 13, wherein the computer-executable instructions further perform operations comprising adjusting a scan pattern, representing a schedule for observing proximate NAPs, to pre-fetch the attribute values.

17. The computer storage media of claim 13. wherein the computer-executable instructions further perform operations comprising:
    learning connection preferences of a user of the computing device; and
    applying the learned connection preferences of the user to select the at least one of the NAPs.

18. A system for aiding network access point (NAP) selection, said system comprising:

a memory area associated with a mobile computing device, said memory area storing data representing a set of NAPs and corresponding attribute values; and a processor programmed to:
- determine a location of the mobile computing device;
- obtain attribute values corresponding to the NAPs near the determined location of the mobile computing device;
- compare the obtained attribute values to one or more sensor values representing a state of the mobile computing device;
- select, based at least on the comparison and without scanning for the NAPs near the determined location, at least one of the NAPs for connection with the mobile computing device; and
- provide navigation directions, after selection of the at least one of the NAPs, to lead the mobile computing device closer to the selected at least one of the NAPs.

19. A method for network access point (NAP) selection, said method comprising:
- determining a location of a mobile computing device;
- obtaining attribute values for a set of NAPs near the determined location of the mobile computing device;
- comparing the obtained attribute values to one or more sensor values representing a state of the mobile computing device;
- selecting, based at least on the comparison and without scanning for the NAPs near the determined location, at least one of NAPs in the set of NAPs for connection with the mobile computing device; and
- providing navigation directions, after selection of the at least one of the NAPs, to lead the mobile computing device closer to the selected at least one of the NAPs.

20. One or more computer storage media embodying computer-executable instructions which, when executed by a processor associated with a computing device, perform operations for network access point (NAP) selection, said operations comprising:
- determining a location of a mobile computing device;
- obtaining attribute values for a set of NAPs near the determined location of the mobile computing device;
- comparing the obtained attribute values to one or more sensor values representing a state of the mobile computing device;
- selecting, based at least on the comparison and without scanning for the NAPs near the determined location, at least one of NAPs in the set of NAPs for connection with the mobile computing device; and
- providing navigation directions, after selection of the at least one of the NAPs, to lead the mobile computing device closer to the selected at least one of the NAPs.

* * * * *